Dec. 1, 1942.　　　R. H. ORR　　　2,303,656
AUTOMOBILE PARKING BUILDING
Filed Dec. 2, 1940　　　5 Sheets-Sheet 1

Fig.1.

INVENTOR
ROBERT H. ORR
BY
HARRIS, KIECH, FOSTER & HARRIS
FOR THE FIRM
ATTORNEYS

INVENTOR
ROBERT H. ORR
BY
HARRIS, KIECH, FOSTER & HARRIS
FOR THE FIRM
ATTORNEYS

Dec. 1, 1942.   R. H. ORR   2,303,656
AUTOMOBILE PARKING BUILDING
Filed Dec. 2, 1940   5 Sheets-Sheet 4

INVENTOR
ROBERT H. ORR
BY HARRIS, KIECH, FOSTER & HARRIS
FOR THE FIRM
ATTORNEYS

Dec. 1, 1942.    R. H. ORR    2,303,656
AUTOMOBILE PARKING BUILDING
Filed Dec. 2, 1940    5 Sheets-Sheet 5

Fig. 9.

INVENTOR
ROBERT H. ORR
BY
HARRIS, KIECH, FOSTER & HARRIS
FOR THE FIRM
ATTORNEYS

Patented Dec. 1, 1942

2,303,656

UNITED STATES PATENT OFFICE 2,303,656

AUTOMOBILE PARKING BUILDING

Robert H. Orr, Los Angeles, Calif.

Application December 2, 1940, Serial No. 368,156

10 Claims. (Cl. 214—16.1)

This invention relates to storage facilities for articles and particularly for wheeled vehicles, such as automobiles.

It relates more particularly to storage structures which have a plurality of floors or stories equipped with storage compartments, and one or more elevators arranged to convey the articles or vehicles to and from the several floors where they are severally disposed in the storage compartments.

One of the objects of the invention is to make provision for the storage of a maximum number of objects in any given volume of storage space. Another object is to provide storage facilities and a method for utilizing such facilities which will permit rapid placing of articles or parking of automobiles and removing or unparking them from their respective storage locations for delivery to the patron at the entrance to the structure.

Another object is to provide means whereby a vehicle may be shifted from one position to another on the storage floors to permit the parking or unparking of another vehicle or vehicles in the rear thereof. This is of special value in automatic parking systems wherein it is necessary to return the shifted automobile to its initial parking position or stall, to the end that whenever it is desired to unpark any vehicle whatever for delivery to the patron, it will always be found in its initial parking stall, thereby avoiding confusion and simplifying the keeping of records and handling of claim checks.

Another object is to provide storage or parking facilities of such a character as to lend themselves to the utilization of an automatic control system wherein all or a part of the parking or unparking movements are carried out by a single act of an operator or attendant.

Another object is to provide storage facilities adapted for use with a storage system, which can function with a minimum of operating personnel.

Another object is to provide a storage structure which will have a storage capacity which is relatively large with reference to the ground area of the structure.

Still another object of this invention is to provide storage facilities at a low first cost which are adapted to function at a low operative cost.

Another object is to provide an automobile storage structure which may be readily converted to other uses should it be desired to discontinue its original use.

Further objects of the invention will be made evident throughout the following part of the specification.

Referring to the drawings, which are for illustrative purposes only.

Figure 1:
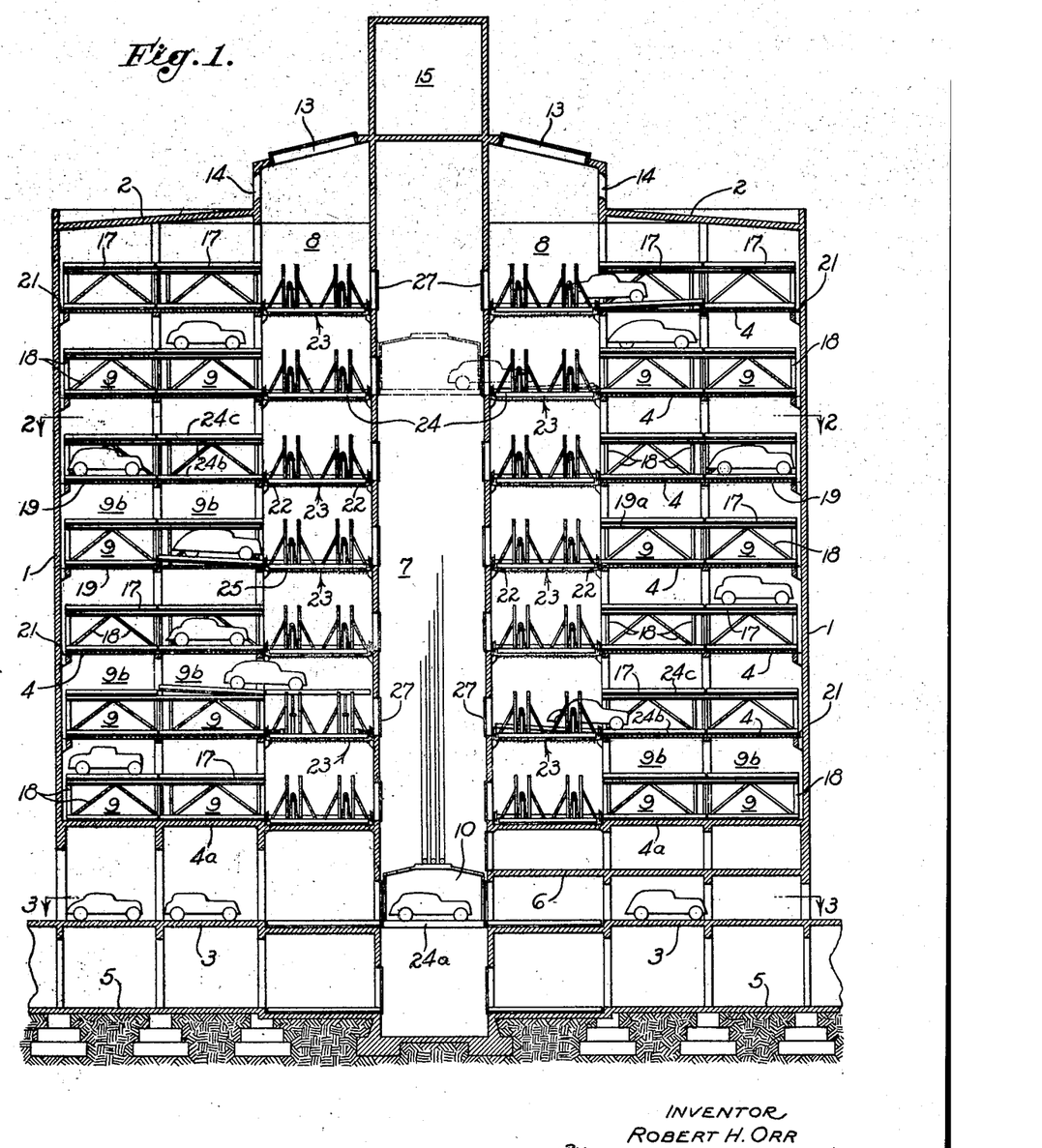
Fig. 1 is a cross-sectional view of a building constructed and equipped in accordance with my invention.
Figure 2:
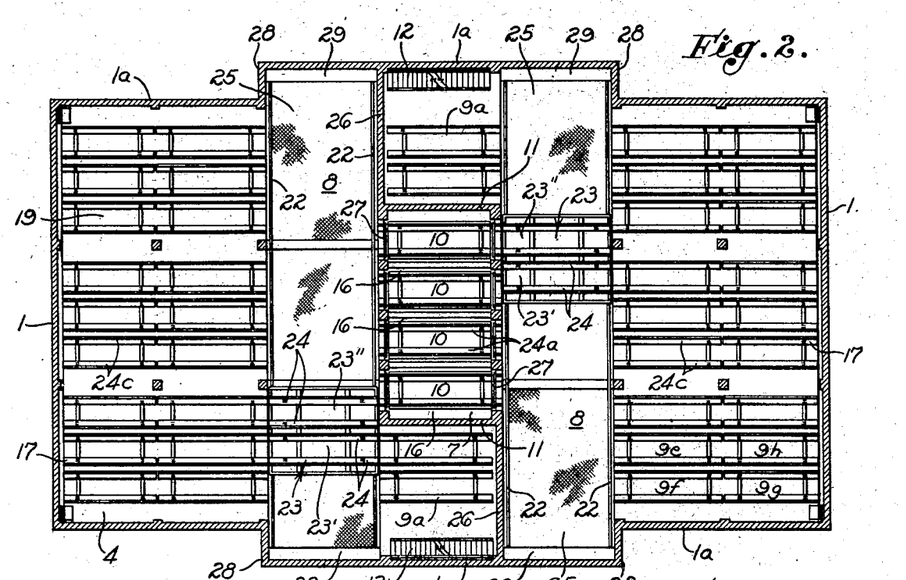
Fig. 2 is a plan view in section of the building taken along the line 2—2 of Fig. 1 and showing one of the upper floors.
Figures 3, 10:
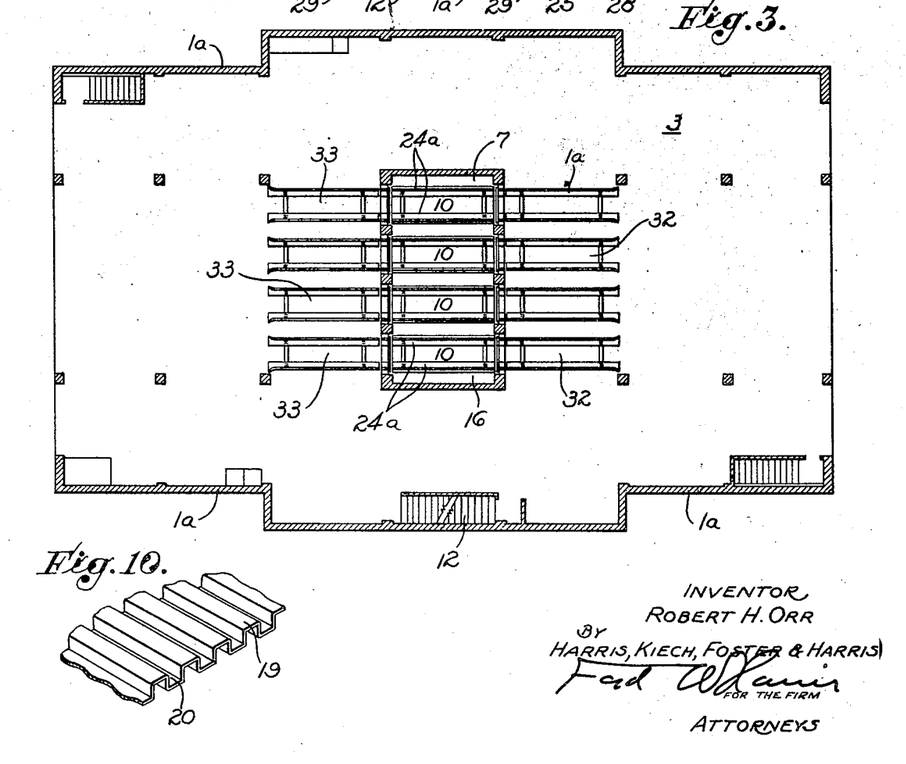
Fig. 3 is a similar plan view taken along the line 3—3 of Fig. 1 and showing the ground floor of the building.
Fig. 10 is an enlarged perspective view of one of the floor racks.

The storage building shown in Figs. 1 to 3 has side walls, 1, 1, 1a, 1a, a roof 2, a ground floor 3, a first floor 4a, and upper floors 4, 4 with vertical clearances of standard office building design. Beneath the main floor is provided a basement 5 which may be arranged similarly to the upper floors for storage or may be utilized for washing, service, or repair work. A mezzanine floor 6 may be included and arranged with a customer's lounge or for sales display of automobiles or automobile parts. These and other features of the building may be varied to suit the different requirements of each particular building or the preferences of any particular proprietor and are not necessary to the embodiment of my invention.

Above the first floor the building is divided vertically, with an elevator shaft 7, a transport lane shaft 8 on either side thereof, and tiers of parking stalls 9. By reference to Fig. 2 of the drawings, it will be seen that the elevator shaft is in this instance equipped with four elevators 10, each operating in one of the elevator hoistways 16, adapted to serve the basement, the main floor, the mezzanine floor, and all of the upper floors of the building. The space between the ends 11 of the elevator shaft and the building walls accommodates one or more parking stalls 9a, between which and the walls 1a are located stairways 12, 12. Each of the transport lane shafts 8 is open from the first floor 4a to the roof, which is constructed with a skylight 13 directly over each transport lane shaft to illuminate the building interior and obviate the need of windows in the building walls. These transport lane shafts extend somewhat above the rest of the building, and the building is ventilated through openings 14 in the walls of this extension. Above the elevator shaft may be constructed a penthouse 15, in which may be housed the control mechanism for the operation of the elevators.

Each floor is provided with a group of stalls on each side of the elevator shaft and between one of the transport lane shafts and one of the side walls of the building. In the drawings each group contains eighteen of such stalls in a double row. Two stalls 9a between one end of the elevator shaft and the building wall on any one floor are associated with one of the groups of eighteen stalls on that floor, making twenty stalls to a bay. The group of eighteen stalls is arranged in two rows of nine each, parallel to the transport lane shafts, with each stall of the rear row aligned with a stall in front of it in the front row.

Spaced vertically midway between each two floors are demountable floors or racks 17 supported by demountable frames 18 each resting on the floor below it. These racks afford at an intermediate level a bay of eighteen stalls 9b. These demountable frames 18 are not permanently attached to the structural frame of the building. Racks 19 of the stalls of the floor bays and racks 17 of the intermediate bays, respectively, are steel sheets supported by and secured to the horizontal structural steel building members in the case of the floor bays and demountedly supported by the demountable racks in the case of the intermediate bays. These stall racks are formed with channel-shaped indentations 20 (see Fig. 10) which run lengthwise of the stall and serve to strengthen the racks against stresses applied at points between their ends and which catch drippings of oil and other materials from the automobiles parked over them.

The stall racks 19 do not extend all the way to the outer walls of the building, and a space 21 thus provided serves as a down-draft ventilating shaft, forming with its corresponding transport lane shaft and the several floor compartments a complete circuit for the circulation of air in the building. An exhaust fan (not shown) located just above the first floor 4a may be used to draw off the heavy automobile exhaust gases from the building.

At each floor level and at each side of each transport lane shaft 8 are track rails 22 upon which a transport carriage 23 moves transversely of the building. Each transport carriage is equipped with two or more pairs of automobile wheel guides 24 adapted and gauged to receive and support two automobiles parallel to each other and relatively close together, the two pairs of guides thus constituting automobile stations 23' and 23". Each elevator is equipped with a single pair of such wheel guides 24a, and each stall with a single pair of such wheel guides 24b, 24c. The stalls are preferably arranged in groups of three, in any one group of which the distance between the track centers of adjacent pairs of guides is preferably the same as that between the track centers of the two pairs of guides on the transport.

The wheel guides 24 on the transport carriages 23, together with associated parts, can be elevated above each transport carriage to register horizontally with the wheel guides 24c of stalls 9b at the intermediate level by mechanism to be described hereinafter. The use of this elevating mechanism in combination with a transverse movement of the transport carriage 23 upon the tracks 22 makes it possible to move the transport carriage wheel guides 24 into registry with the wheel guides 24c of any intermediate level stall 9b.

Safety nets 25 are secured across the transport lane shaft at each floor level as a protection against accidentally falling bodies.

An automobile storage building constructed as described has the advantage that it may readily be converted into a store or office building should it be decided to discontinue its original use. The demountable racks 17 and the demountable frame 18 are readily removable; the floor racks 19 may be readily extended to the building wall at one end and across the transport lane shaft to the elevator shaft at the other end; the floor racks, including their extensions, may be readily fireproofed with overlying cement; and windows, partitions, and doors may be readily installed throughout the building.

In order to divide the building above the main floor into two separate compartments for the better control of an outbreak of fire in one side of the building, a solid wall 26 is provided between each of the walls 1a and the adjacent end 11 of the elevator shaft 7. Since the elevator shaft itself is also provided with four solid side walls equipped with solid hoistway doors 27, the building is divided vertically into two compartments. If desired, artificial illumination may be relied on to light the building interior and one or more of the floor levels may be continued across the ventilator spaces 21 and the transport lane shafts 8 to further block off the building into horizontal compartments for better fire control.

The walls 1a are offset outwardly at 28, 28 (Fig. 2) to form a wall projection which affords recesses 29 registering with the transport lane shafts 8 and forming a continuation thereof. These recesses are provided to make it possible to park a car in or remove a car from a rear corner stall 9h (Fig. 2) with a minimum of movements of the transport carriage 23. A building structure constructed in accordance with this invention is adaptable to either a manual or automatic mechanical system of storing the cars. In either case it is desirable to have a car remain for the period of storage in a certain designated stall where it will be found for delivery to the patron driver. This condition is necessary where a claim check system is used, in which the stall number appears on the claim check, a feature which avoids confusion and simplifies the records and the handling of claim checks. The advantage of the recesses 29 will appear from a description of the handling of a car to and from storage.

When a car enters the building at the main floor level 3, it is driven onto one of a group of receiving stations 33, each of which is adjacent to and aligned with a hoistway 16. A claim check is given the driver by the operator. The corresponding elevator 10 is brought to the ground floor 3, if not already there, and the car is moved onto the elevator and is carried in the elevator to one of the floors 4, and a transport carriage 23 moved into such position that one of its pairs of transport guides 24 is in registry with the elevator guides 24a. The car is then moved from the elevator 10 to the transport carriage 23, which is then propelled transversely into such position that the transport guides 24 supporting the automobile are in registry with the stall guides 24b of that pair of empty stalls 9, one in front of the other, into one of which it is desired to park the car. The car is then moved from the carriage 23 to the stall 9, completing the parking operation. The sequence of steps of the reverse operation of unparking, by which the car is taken to one of delivery stations 32, is apparent.

When there is already a car in the rear one of a pair of stalls 9 arranged in tandem, one in front of the other, there is no difficulty in parking a car in the empty front stall in the manner just outlined. However, if there is a car in front stall 9e (see lower right-hand corner of Fig. 2), and it is desired to park a car in stall 9h behind it, the following sequence of steps becomes necessary. The transport carriage 23 is moved until either one of its stations 23' and 23'' is in registry with the guides 24a of the elevator which is carrying the automobile to be stored. The automobile is then moved onto the carriage, which is moved until its empty station is in registry with the stall 9e. The car in 9e is moved on to the empty station of the carriage. The carriage is shifted until the car just received from the elevator is in alignment with stall 9e. This car is rolled into stall 9e and thence into stall 9h. The carriage is again shifted until its other station is in alignment with stall 9e, and the car thereon is moved back into its original position in stall 9e. The sequence of movements for removing the car from 9h is obvious.

The above described sequences will care for the parking or removing of a car in all cases except when it is desired to install or remove a car from stall 9g in the extreme lower corner of Fig. 2, or a similarly located stall in one of the other three corners of the building.

In that case, if there is already a car in stall 9f the transport carriage must be first used to move it to a front stall which happens to be empty, before the incoming car can be parked in stall 9g. If all front stalls are occupied, excessive shifting becomes requisite to utilize a rear stall which happens to be empty as temporary storage for the interfering car in stall 9f. Finally, if there are no empty stalls in either front or rear rows, it becomes necessary in order to park a car or unpark a car in stall 9g, if the lane 8 terminates at the wall 1a, to first move the transport carriage to align the two transport stations simultaneously with stalls 9e and 9f and remove the cars therein onto these two transport carriage stations, then move the carriage to alignment of its station 23' with stall 9e, roll the automobile thereon into stall 9e, move the carriage with its station 9e into alignment with the elevator, roll the automobile to be stored from the elevator into carriage station 23', move the carriage to a position of alignment of its station 23' with stall 9f, roll the automobile to be stored through stall 9f to stall 9g, move the carriage to a position of alignment of its station 23' with stall 9e, roll the automobile in stall 9e onto carriage station 23', move the carriage into a position of alignment of its two stations simultaneously with stalls 9e and 9f and roll the two automobiles on its two stations into stalls 9e and 9f from which they were initially and respectively removed.

It would probably be more efficient to forego the use of the stall 9g at such times when all other stalls are occupied rather than to provide the recess 29, but when the system is mechanically operated and automatically controlled, and the sequence of movements is predetermined and standardized as described in Patent No. 2,204,023 issued June 11, 1940, to Howard F. Mason, if the recess 29 is not provided, either the stall 9g must be unused at all times or automatic equipment to effect the long complicated sequence just described must be installed. If the recess 29 is provided the sequence is greatly simplified. The car in 9f is moved onto carriage station 23'', which because of the recess 29 can be brought into registry with stall 9f. The carriage is moved to the elevator shaft and the car to be stored moved into station 23', and then by a sequence of movements which is apparent the car to be stored is placed in stall 9g and the car which was in stall 9f is returned to that stall.

Figure 4:
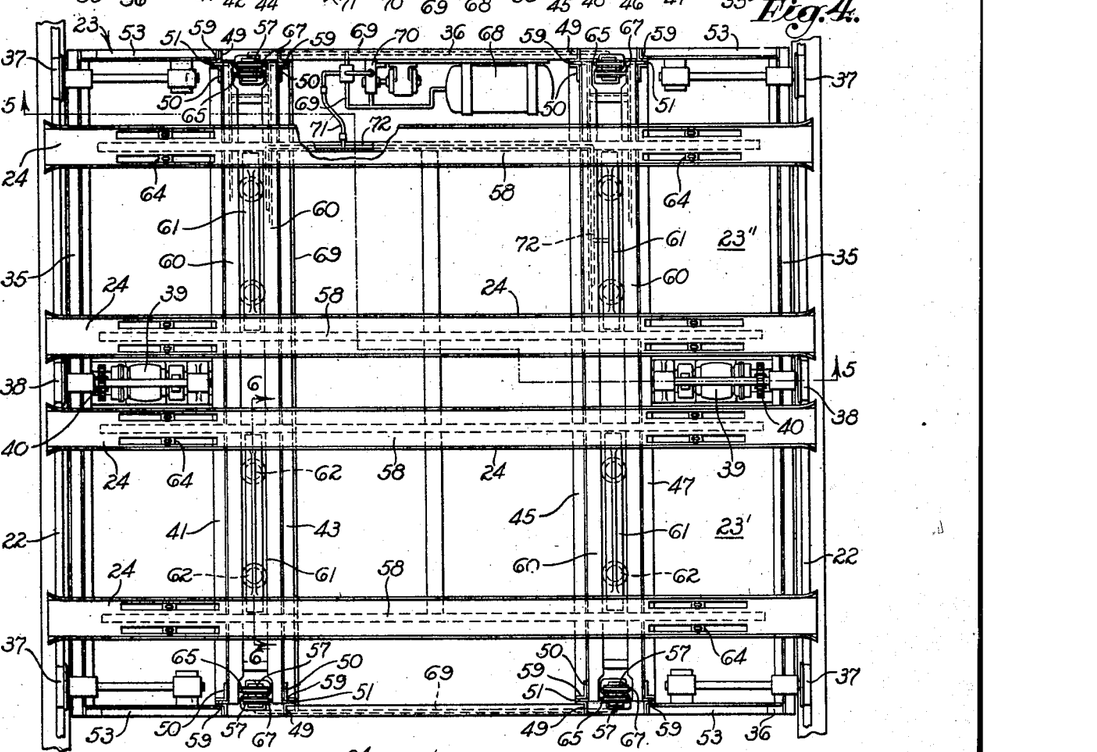
Fig. 4 is a plan view of the transport carriage.
Figure 5:
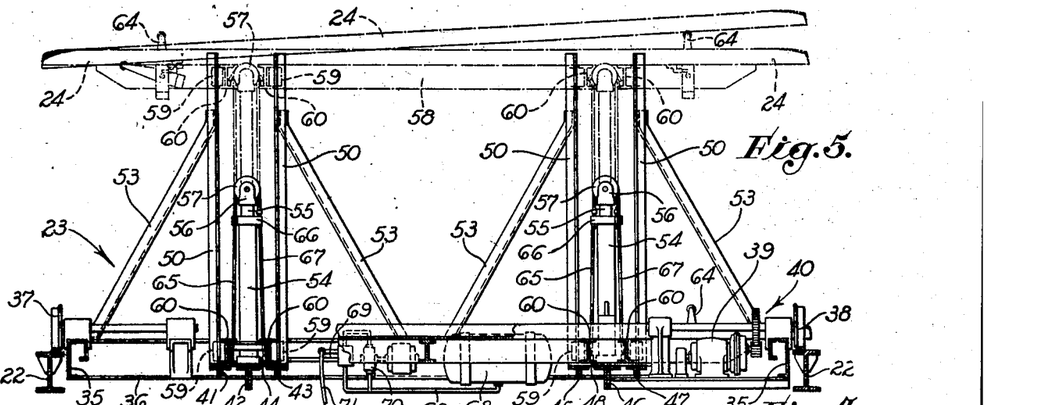
Fig. 5 is a sectional elevation of the transport carriage taken along the line 5—5 of Fig. 4.

The main frame of the transport carriage 23 consists of longitudinal channels 35 and transverse channels 36 welded at their ends to form a rectangular frame, upon which is suitably mounted idler wheels 37 and traction wheels 38, engaging the tracks 22. The latter are driven by electric motors 39 through gearing 40. At one side of the carriage three T-beams 41, 42 and 43, each made from two angle beams, are secured in horizontal position to the transverse channels 36 and support at each end a plate 44. At the other side of the carriage similar beams 45, 46 and 47 are mounted and support at each end a plate 48. Upon each of these plates two angle irons 49 and two angle irons 50 are mounted in vertical position to afford two pairs of standards, each pair of standards comprising one angle iron 49 and an associated angle iron 50, suitably secured together in spaced relationship at a small distance from each other horizontally, to provide a slot 51. Braces 53 between the standards 49 and channels 36 maintain the standards in upright position. Four hydraulic cylinders 54 having operatively fitted therein plungers 55 are also mounted one on each of the four plates 44 and 48 respectively. Heads 56, at the upper ends of these plungers, each carry two sheaves 57.

Figure 6:
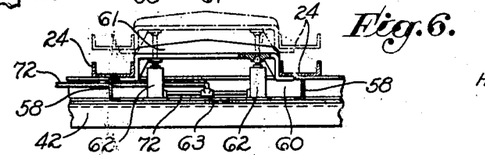
Fig. 6 is a vertical elevation taken along the line 6—6 of Fig. 4.

The automobile supporting frame of the carriage 23 comprises four channel beams 58 arranged in two pairs, each pair parallel to the channels 36, and all four held in rigid relationship by four cross I-beams 60, to which they are welded. Each I-beam 60 is disposed at each end between a cylinder 54 and the proximate standards 49 and 50, an arrangement which prevents lateral displacement of the I-beams. On the outer face of the web of each I-beam, and at each of its ends is secured a small plate or ear 59 which projects into the corresponding slot 51, an arrangement which prevents longitudinal displacement of the I-beams. Each pair of wheel guides 24 is secured at each end to, and supported by, a yoke 61, (see Fig. 6) which is mounted to be elevated by means of a hydraulic jack device 62 mounted on a plate 63 on top of the I-beam 60. Appropriate automatic stops 64 such as are described in the application of Howard F. Mason, Serial Number 158,365, may also be mounted on the channel beams 58, to hold the automobile or vehicle in place upon the wheel guides while the latter are in level position and to appropriately release the vehicle when the guides are inclined by the action of the jacks 62.

Each of four short cable lengths 65 is anchored at one end to a left-hand beam of one of the two pairs of I-beams 60, is passed over one of the sheaves of one of the four pairs of sheaves 57, and is secured at its other end to the adjacent side of the upper end 66 of one of the cylinders 54. Each of four other short cable lengths 67 is anchored at one end to a right-hand beam of one of the two pairs of I-beams 60, is passed over the other sheave of each of the four pairs of sheaves 57, and is secured at its other end to the adjacent side of the upper end 66 of one of the cylinders 54. When liquid is admitted to the hydraulic cylinders 54, the plungers 55 rise in unison and the vehicle supporting frame is elevated a distance which is twice the extent of the vertical movement of the plungers.

Liquid for the hydraulic cylinders is supplied through piping 69 from a tank 68 in which the pressure is maintained by a pump 70. Liquid is also conducted from the same source through flexible hose 71 and piping 72 to the hydraulic devices 62 for inclining the wheel guides 24. These hydraulic lifting mechanisms are controlled by suitable valves (not shown) and, in an automatic storage system, these valves will be operated automatically in proper chronological sequence.

When it is desired to store an article or a vehicle in one of the upper stalls 9b, it is brought in one of the elevators to the level of one of the floors 4. It is there unloaded onto the transport carriage which has been previously brought into registry with the elevator hoistway. The carriage is then moved on its tracks 22 until it is opposite the proper stall 9a, the cylinders 54 and plungers 55 are operated to elevate the wheel guides 24 until they are at the level of the stall 9b, the jacks 62 at one end or the other of the wheel guides are operated to roll the vehicle into a stall 9b on one or the other side of the transport lane as the case may be.

Figure 7:
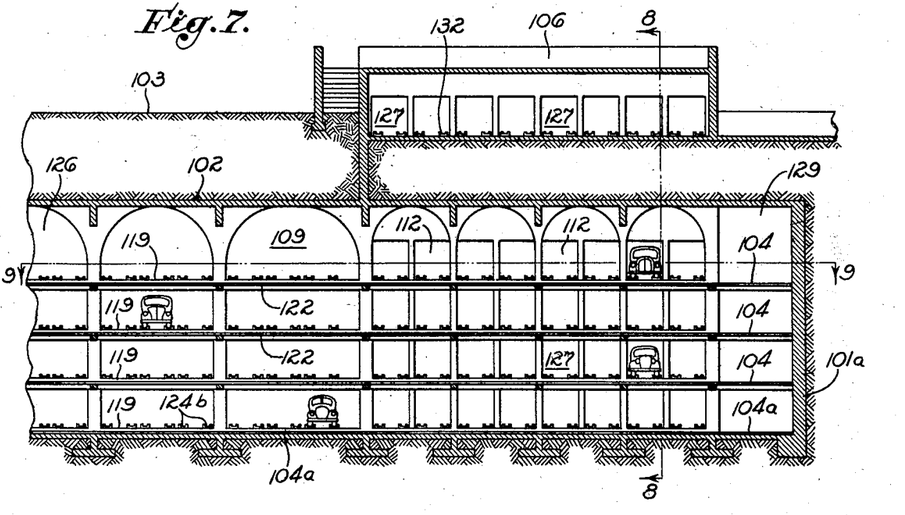
Fig. 7 shows in vertical section taken along the line 7—7 of Fig. 9 an underground structure embodying my invention.
Figure 8:
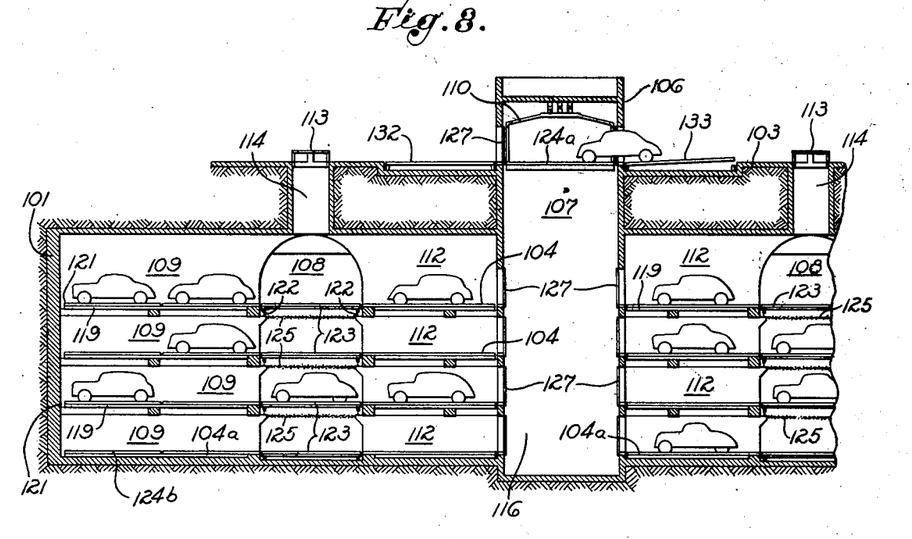
Fig. 8 is a vertical section taken along the line 8—8 of Fig. 7.
Figure 9:
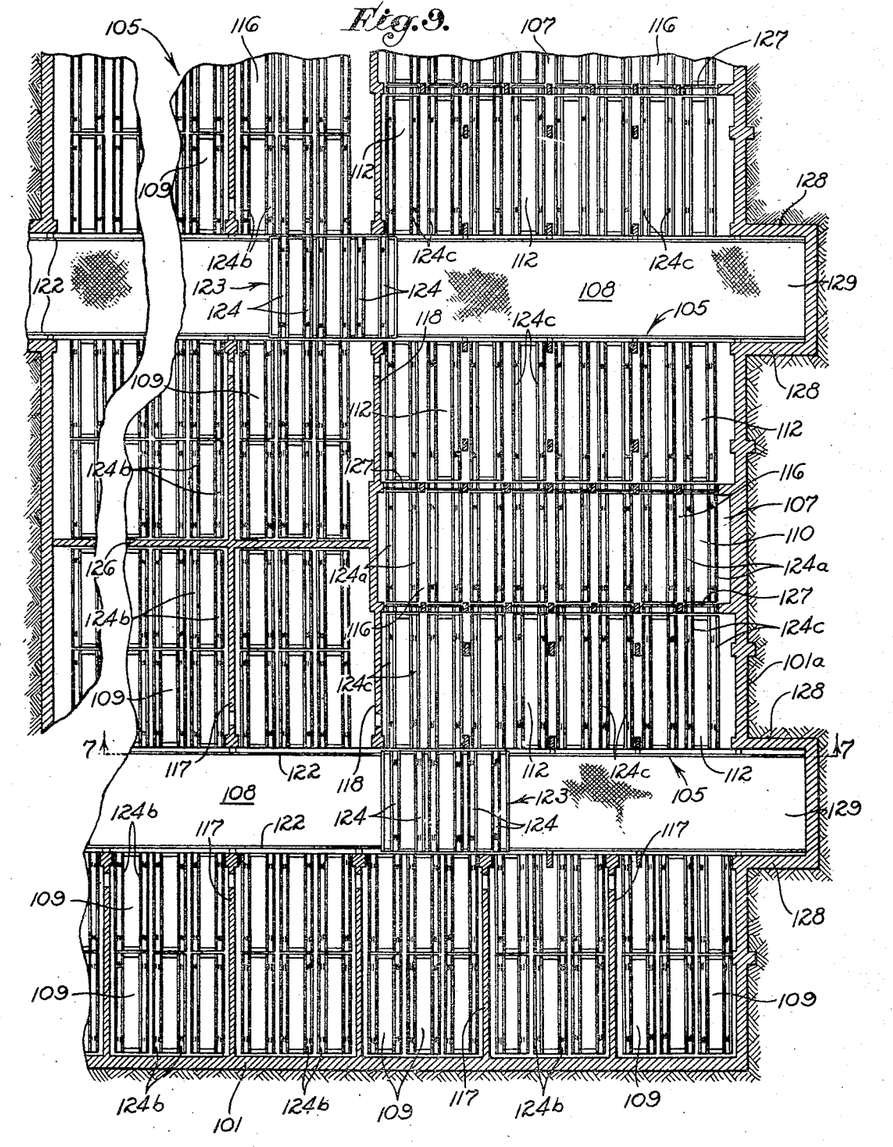
Fig. 9 is a horizontal section taken along the line 9—9 of Fig. 7.

Figs. 7, 8, and 9 show an underground storage structure embodying my invention. The elevator shafts 107 extend vertically downward from the ground level 103 and extend upwardly from the ground level in the one story superstructures 106. In each of the shafts are several hoistways 116 each equipped with an elevator 110. The hoistways are equipped at the ground level 103 and at each of the underground floor levels 104 with solid hoistway doors 127. Incoming vehicles are moved onto one of the receiving stations 133 for loading onto an elevator, and outgoing vehicles are moved from an elevator onto one of the delivery stations 132. The elevators are equipped with wheel guides 124a upon which the wheels of a vehicle rest.

The underground structure is arranged to provide elevator compartments 105 comprising the centrally disposed elevator shafts 107 flanked on each side at each floor level by a row of laterally aligned waiting stations 112, each of which is aligned with a hoistway 116 and is provided with wheel guides 124c aligned with the wheel guides of its associated elevator. On either side of each elevator compartment 105 there is a transport lane shaft 108 vertically open from the level 104a to the ceiling 102 and having along its sides at each floor level track rails 122 on which there operate transport carriages 123 equipped with wheel guides 124. On either side of each transport lane shaft 108 and at each floor level there are two rows of laterally aligned stalls 109, the stalls of the rear row aligning with the stalls of the front row. The stalls are provided with wheel guides 124b with the same wheel gauge as the wheel guides of the remainder of the system. The rear ends of the rear stalls on the elevator side of one shaft 108 abut the rear ends of the rear stalls of the elevator side of the other shaft 108 on each floor, and are separated therefrom by the partition wall 126, which extends from the elevator compartment to the underground wall 101a at the end of the building remote from the elevator shaft 107, and from the floor level 104a to the ceiling 102.

The shafts 108 extend at each end into recesses 129 formed by offsetting the wall 101a at 128, 128. They serve a purpose similar to that of the recesses 29 of the building shown in Figs. 1 to 3. The shafts 108 are provided with safety nets 125 at the floor levels to prevent accidentally displaced objects from falling the full length of the shaft.

The wheel guides 124b of the stalls are mounted on sheet steel racks 119 formed with longitudinal channel-shaped indentations as shown in Fig. 10. These racks constitute the stall floors. They terminate a short distance from the underground walls 101, 101 or the partition wall 126, as the case may be, an arrangement which provides a ventilating passageway 121. The passageways with the shaft 108 and the stalls form a continuous path for the circulation of air. If the structure is equipped with appropriately placed exhaust fans, it can be readily provided with fresh air at all times. To assist in accomplishing this objective, ventilators 114 may be provided, from the ceiling 102 to the ground level 103, which are preferably arranged directly above the shafts 108. Skylights 113 above the shafts 108 assist in lighting the underground compartments.

The stalls 109 may be arranged in groups of two, three, or more, and the transport carriages are large enough to afford at least two vehicle stations thereon. In the drawings, three such stations are shown on each carriage. The building may be provided with transverse partition walls 117 extending between stall groups from the partition wall 126 or the outside walls 101, 101, to the shafts 8. It will be observed that the partition wall 126, together with the elevator compartment wall 118 and the hoistway doors 127, divides the underground storage space into two separate compartments, facilitating fire control and ventilation.

In this underground arrangement, the waiting stations 112 provide greater flexibility in the handling of the vehicles or other stored articles. If the elevators place vehicles at the floor levels more rapidly than the carriages 123 can distribute them to the stalls, the vehicles may be temporarily lodged at these waiting stations. They also serve to hold vehicles brought by the carriages to the elevators more rapidly than the elevators can take them away. While these waiting stations are not shown in Fig. 2 of the drawings, it is obvious that by a rearrangement of the floor plan of the building shown therein, provision can be made for waiting stations on either side of the hoistways 16, by increasing the distance between the transport lane shafts 8. Space will thus be provided also for three additional rows of stalls 9a two of which can be served from one transport carriage and one of which can be served from the other transport carriage.

It is also obvious that the intermediate removable floor racks 17 shown in Fig. 1 can be made a feature of the underground structure shown in Figs. 7, 8, and 9 by providing sufficient clearance between the floor levels 104 to accommodate these intermediate racks.

Two embodiments of the invention are shown and described. The several features of the invention are not to be construed as limited to these embodiments, for they may be utilized in structures of other types and designs. The invention is set forth in the following claims.

I claim as my invention:

1. In a storage structure: walls; a roof; a structural framework within said walls and roof adapted to support a plurality of floors; a plurality of similar superimposed floors mounted in said framework, each spaced a small distance from one of said walls to provide a vertical ventilating passageway and each adapted to provide a plurality of storage stalls; an elevator hoistway spaced from the inner edges of said floors; a vertically open shaft occupying the space between said hoistway and the inner edges of said floors of a length substantially equal to the width of said floors and of a width suitable for mounting a plurality of transport carriages each for movement in a horizontal path in said shaft between said hoistway and a corresponding one of said floors.

2. In a storage structure: walls; a roof; a structural framework within said walls and roof adapted to support a plurality of floors; a plurality of similar superimposed floors mounted in said framework, each spaced a small distance from one of said walls to provide a vertical ventilating passageway and each adapted to provide a plurality of storage stalls; an elevator hoistway opposite and spaced from the inner edges of said floors; a vertically open shaft occupying said space between said hoistway and the inner edges of said floors of a length substantially equal to the width of said floors and of a width suitable for mounting a plurality of transport carriages each for movement in a horizontal path in said shaft between said hoistway and a corresponding one of said floors and adapted to afford a means of conveyance of storage articles between said elevator and said storage stalls; and a ventilator leading outside of said building disposed at the top of said shaft.

3. In a storage structure having enclosing walls: a plurality of laterally aligned storage stalls disposed in a row which terminates at one of said walls; a lane arranged along the receiving ends of said stalls and contiguous thereto and suitable for movement therealong of a transport carriage of sufficient size lengthwise of said lane to support in lateral alignment thereon a plurality of storage articles, each of which articles is of a width adapted to be stored in one of said stalls, said wall at which said row of stalls terminates having an outwardly projecting recess registering with and forming an extension of said lane and of a depth substantially equal to the width of at least one of said stalls.

4. In a storage structure: a hoistway; an elevator in said hoistway; a plurality of floors in said structure served by said elevator; rows of stalls on said floors at the level of said floors; a horizontal trackway at each of said floors; a transport carriage movable in each of said trackways and adapted to act as a means of conveyance between said elevator and said stalls; rows of upper stalls one above each floor at an intermediate level, said upper stalls opening upon said trackways; and means on said carriage for moving a storage article vertically between the floor level and the level of said upper stalls.

5. In a storage structure: a structural steel framework providing support for a plurality of floors; floors mounted in said framework comprising plates formed with relatively closely spaced channel-shaped corrugations; an open vertical shaft through said floors at one side of which said corrugations terminate; demountable racks supported at said floor levels; demountable plates formed with relatively closely spaced channel-shaped corrugations mounted at levels intermediate of said floors on said racks with said corrugations terminating at one side of said shaft; an elevator hoistway; an elevator in said hoistway adapted to serve said floors; a horizontally movable carriage mounted in said shaft at the level of each of said floors adapted to serve as a means of conveyance for storage articles from said elevator to points along its corresponding floor; and means on said carriage for moving a storage article vertically between the floor level and the level of said demountable plates.

6. In a storage structure: a hoistway; an elevator in said hoistway; wheel guides on said elevator; a storage floor served by said elevator; a first station on said floor next to said hoistway at one side thereof; wheel guides on said station adapted to register with said elevator wheel guides at one end thereof; a second station on said floor next to said hoistway on the other side thereof; wheel guides on said second station adapted to register with said elevator wheel guides at the other end thereof; a first transport lane arranged normal to said wheel guides and fronting upon said first station; a second transport lane arranged normal to said wheel guides and fronting upon said second station; a carriage in each of said lanes adapted to move longitudinally thereof; wheel guides on said carriages adapted to register with the wheel guides on said first and second stations respectively; a front and a rear row, proximate said front row, of laterally aligned storage stalls disposed on each side of each of said lanes, the front ends of the stalls of said front rows opening on said lanes, and the rear ends of the stalls of the rear row on the hoistway side of one of said lanes abutting the rear ends of the stalls of the rear row on the hoistway side of the other of said lanes, and the front ends of the stalls of the front rows on the hoistway side of said lanes being aligned with the ends of said stations next to said lanes; wheel guides in each of said stalls in said front rows adapted to register with the wheel guides on said carriages; and wheel guides in each of said stalls in said rear rows adapted to register with the wheel guides of a stall in the proximate front row.

7. In a storage structure: walls; a roof; a structural framework within said walls and roof adapted to support a plurality of floors; a plurality of similar superimposed floors mounted in said framework, each spaced a small distance from one of said walls to provide a vertical ventilating passageway and each adapted to provide a plurality of storage stalls; an elevator hoistway spaced from the inner edges of said floors; a vertically open shaft occupying the space between said hoistway and the inner edges of said floors for mounting a plurality of transport carriages each for movement in a horizontal path in said shaft between said hoistway and a corresponding one of said floors; and a skylight disposed in the roof of said structure above said shaft so as to admit light thereto.

8. In a storage structure: walls; a roof; a structural framework within said walls and roof adapted to support a plurality of floors; a plurality of similar superimposed floors mounted in said framework, each spaced a small distance from one of said walls to provide a vertical ventilating passageway and each adapted to provide a plurality of storage stalls; an elevator hoistway spaced from the inner edges of said floors; a vertically open shaft occupying the space between said hoistway and the inner edges of said floors for mounting a plurality of transport carriages each for movement in a horizontal path in said shaft between said hoistway and a corresponding one of said floors; and a ventilator disposed at the top of said shaft and leading out of the structure.

9. In a storage structure: a hoistway; an elevator in said hoistway; a plurality of floors in said structure served by said elevator; rows of stalls on said floors at the approximate level of said floors; a horizontal trackway at each of said floors; a transport carriage movable on each of said trackways and adapted to act as a means of conveyance between said elevator and said stalls; rows of upper stalls one above each floor at an intermediate level, said upper stalls opening upon said trackways; track means on said transport carriage adapted to support a storage article; and means on said transport carriage for moving said track means vertically between the floor and the level of said upper stalls to permit the insertion or removal of the storage article from one of said upper stalls.

10. In a storage structure: a hoistway; an elevator in said hoistway; a plurality of floors in said structure served by said elevator; rows of stalls on said floors at the approximate level of said floors; a horizontal trackway at each of said floors; a transport carriage movable on each of said trackways and adapted to act as a means of conveyance between said elevator and said stalls; rows of upper stalls one above each floor at an intermediate level, said upper stalls opening upon said trackways; track means on said transport carriage adapted to support a storage article; means on said transport carriage for moving said track means vertically between the floor and the level of said upper stalls to permit the insertion or removal of the storage article from one of said upper stalls; and means for tilting said track means when the same is aligned with one of said upper stalls to convey the storage article from the track means into said one stall.

ROBERT H. ORR.